Figure 1:
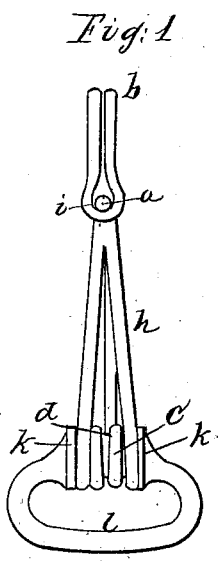

O. S. Judd,
Snap Hook,
№ 60,902. Patented Jan. 1, 1867.

Witnesses
Chas Blakeslee
Jeremy W Blis

Inventor
Oliver S Judd

United States Patent Office.

OLIVER S. JUDD, OF NEW BRITAIN, CONNECTICUT.

Letters Patent No. 60,902, dated January 1, 1867.

IMPROVEMENT IN SNAP HOOKS.

The Schedule referred to in these Letters Patent and making part of the same.

TO ALL WHOM IT MAY CONCERN:

Be it known that I, OLIVER S. JUDD, of New Britain, county of Hartford, and State of Connecticut, have invented certain new and useful Improvement in Snap Hooks; and to enable others skilled in the art to make the same, I proceed to describe its construction, by referring to the drawings, in which letters indicate like parts in each of the figures.

The nature of this improvement will be understood from the specification and drawings. It consists in making the hook, latch, spring, and bearing for the fulcrum pin of one piece of bent metal, and also in making the strap loop, its fulcrum pin, and flanges, (which form the joint and give symmetrical appearance to the whole device,) in one piece of metal. In the accompanying drawings—

Figure 2:
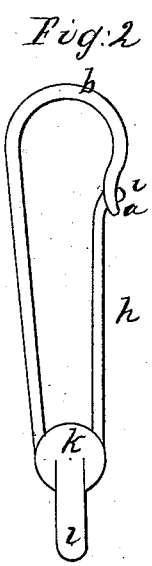
Figure 3:
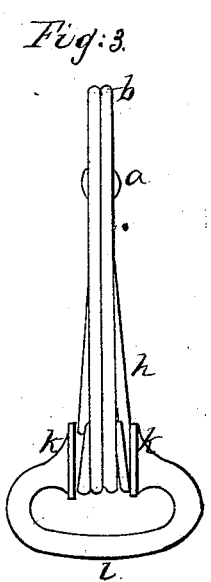

Figure 1 is a front view, showing the latch, with its bent or hook end catched into the eye of the hook proper.
Figure 2 is a side view of the same.
Figure 3 is a back side view thereof.

Now, it will be clearly seen that by taking a straight piece of metal, of the proper length, and bending it so as to form an eye, as shown at $a$, then bending it again so as to form a hook, as shown at $b$, then giving the outer ends one or more turns, so as to bring or form a spiral spring, $c$, or orifice, $c$, or both combined, to form a connection or an opening to receive the fulcrum $d$ of the strap loop $e$; then the two ends are united to form a latch, $h$, the end of which to be so bent as to form a catch or hook, $i$, which catches or hooks into the eye $a$. The strap loop $e$ is made of one piece of metal, and is made open in the centre of its fulcrum pin, so as to receive the spring or joint formation, $c$, of the hook proper; after which the two parts of strap loop which constitute the fulcrum pin are set or closed together, thus securing the spring of the hook $b$ upon the fulcrum pin $d$, between the flanges $k$. Thus a snap hook, possessing all the requisite qualities therefor, and made of only two pieces of metal. I believe I have thus shown the nature, construction, operation, and advantage of this improvement so as to enable others skilled to make and use the same therefrom.

I claim as a new article of manufacture a snap hook constructed substantially as and for the purpose described.

OLIVER S. JUDD. [L. S.]

Witnesses:
CHAS. BLAKESLEE,
JEREMY W. BLISS.